United States Patent
Baumann et al.

(10) Patent No.: US 7,552,804 B2
(45) Date of Patent: Jun. 30, 2009

(54) DISK BRAKE WITH SELF-BOOSTING

(75) Inventors: Dietmar Baumann, Hemmingen (DE);
Dirk Hofmann, Ludwigsburg (DE);
Herbert Vollert, Vaihingen/Enz (DE);
Willi Nagel, Remseck/Hochdorf (DE);
Andreas Henke, Diemelstadt (DE);
Bertram Foitzik, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 453 days.

(21) Appl. No.: 10/873,454

(22) Filed: Jun. 23, 2004

(65) Prior Publication Data
US 2004/0262101 A1    Dec. 30, 2004

(30) Foreign Application Priority Data
Jun. 24, 2003   (DE) .............................. 103 28 244

(51) Int. Cl.
*F16D 55/02*    (2006.01)
*F16D 51/00*    (2006.01)

(52) U.S. Cl. .................. 188/71.8; 188/71.7; 188/72.7

(58) Field of Classification Search ................ 188/71.7, 188/71.8, 71.9, 72.7, 79.51, 79.56, 196 R
See application file for complete search history.

(56) References Cited

U.S. PATENT DOCUMENTS

| 5,000,294 | A | * | 3/1991 | Hunnicutt et al. | ........... 188/71.9 |
| 5,060,765 | A | * | 10/1991 | Meyer | ........... 188/71.9 |
| 6,311,807 | B1 | * | 11/2001 | Rinsma | ........... 188/71.9 |
| 6,684,982 | B2 | * | 2/2004 | Kariyama | ........... 188/71.7 |
| 6,978,868 | B2 | * | 12/2005 | Schautt | ........... 188/72.7 |

FOREIGN PATENT DOCUMENTS

WO        WO-02095257 A2 *  11/2002

* cited by examiner

*Primary Examiner*—Melody M Burch
(74) *Attorney, Agent, or Firm*—Ronald E. Greigg

(57) ABSTRACT

An electromechanically actuatable disk brake with a self-boosting device includes a wear readjusting device which can for instance be adjusted by means of an electric motor as an actuator, to compensate for wear of the friction brake lining.

3 Claims, 3 Drawing Sheets

DISK BRAKE WITH SELF-BOOSTING

BACKGROUND OF THE INVENTION

1. Field of the Invention

The invention relates to an improved disk brake with self-boosting.

2. Description of the Prior Art

Disk brakes are known that have a friction brake lining, which for braking can be pressed by an actuation unit against a brake disk, and a self-boosting device which converts a frictional force, which the rotating brake disk upon braking exerts on the friction brake lining pressed against it, into a contact-pressure force, that in addition to the actuation unit presses the friction brake lining against the brake disk. As a result, a contact-pressure force to be exerted by the actuation unit is reduced and self-boosting is attained.

Mechanical self-boosting devices with wedge mechanisms or lever systems are known. The wedge mechanisms are also known as ramp mechanisms. This list is not exhaustive. Wedge mechanisms have a wedge on a back side of the friction brake lining, remote from the brake disk, that is braced on a counterpart wedge. The counterpart wedge is typically fixedly disposed in a brake caliper of the disk brake. The counterpart wedge forms a bracing means for the friction brake lining, on which the friction brake lining in braking is braced at a support angle obliquely to the brake disk. The wedge angle and support angle are typically of equal size.

If the friction brake lining for braking is pressed by the actuation unit against the rotating brake disk, the frictional force exerted by the rotating brake disk on the friction brake lining pressed against it displaces the friction brake lining in the direction of a narrowing wedge gap between the counterpart wedge and the brake disk. As a force of reaction, the counterpart wedge exerts a force on the wedge that has one component transverse to the brake disk. This force transverse to the brake disk is an additional contact-pressure force, which in addition to the actuation unit presses the friction brake lining against the brake disk and as a result increases the total contact-pressure force, resulting in the self-boosting.

In the case of lever mechanisms, the friction brake lining in braking is braced on a lever that is oblique to the brake disk at a support angle. The support angle corresponds to the wedge angle in the wedge mechanism; both mechanisms are mechanically comparable to one another, with the special feature that the support angle of a lever mechanism can change, and if no countermeasure is taken, it does in fact change.

Still other self-boosting systems, for instance hydraulic ones, are also known.

The problem exists that a displacement travel distance, by which distance the friction brake lining must be displaced in order to actuate the disk brake until it rests on the brake disk, increases with increasing wear of the friction brake lining.

OBJECTS AND SUMMARY OF THE INVENTION

The disk brake of the invention has a wear readjusting device with an actuator to compensate for wear of the friction brake lining, with which device a spacing between the bracing means of the friction brake lining and the brake disk can be set. In this way, an air clearance, that is, a spacing between the friction brake lining and the brake disk when the disk brake is not actuated, can be set actively. The wear of the friction brake lining can be compensated for, so that a displacement travel distance of the friction brake lining, required to actuate the disk brake, will not increase. As a result, a tightening time upon actuation of the disk brake is not lengthened, either. At the same time, a displacement travel distance of the friction brake lining required for the self-boosting, parallel to the brake disk, does not increase either, so that the installation space required by the disk brake is reduced.

A further advantage of the invention exists in disk brakes that have a varying self-boosting: It is known, instead of a wedge with a wedge angle that is constant over its length, to provide a ramp with a ramp angle that varies over its length as a bracing means for the friction brake lining. The ramp angle is equivalent to the wedge angle and the support angle. In this way, for instance with increasing displacement of the friction brake lining or in other words with high contact-pressure and braking forces, to attain a greater self-boosting. At the onset of displacement of the friction brake lining, the air clearance is rapidly overcome, and no self-boosting is required to achieve this. In such disk brakes, the magnitude of the self-boosting for a certain contact-pressure force would vary if, because of wear to the friction brake lining, its displacement travel distance along the ramp that braces it were lengthened, because the friction brake lining is braced at another point on the ramp with a different ramp angle and thus a different support angle. Because of the wear readjusting device of the invention, this disadvantage is overcome, since the air clearance between the friction brake lining and the brake disk with the brake unactuated, and thus a displacement travel distance of the friction brake lining required to attain a certain contact-pressure force, can be kept constant along the ramp.

The readjusting device may for instance have a pneumatic or hydraulic actuator, a piston-cylinder unit, or a pneumatic hydraulic motor. An electromechanical actuator for the readjusting device may be provided, and the electromechanical actuator in particular has an electric motor with a gear or an electromagnet. That is advantageous especially if the actuating device for pressing on the friction brake lining also operates electromechanically; in that case, the disk brake functions solely electromechanically and requires only electrical energy.

The wear readjusting device can have its own actuator. A switchover or activation device, which enables an actuation of the wear readjusting device with the actuation unit for pressing against the friction brake lining may be provided. As a result, a separate actuator for the readjusting device is dispensed with. Switching over means that the actuation unit either presses the friction brake lining against the brake disk or adjusts the wear readjusting device. Activation means that the actuation unit selectively presses the friction brake lining against the brake disk, or upon activation of the wear readjusting device simultaneously adjusts it as well. So-called distributor gears with one input and two outputs can be used as switchover or activation devices, in which case the input is driven by the actuation unit, one output displaces the friction brake lining, and the other output adjusts the wear readjusting device. The drive can be switched over from one output to the other, or the other output can be activated to make it a constantly-driven output for the wear readjusting device.

One embodiment provides a restoring device for the wear readjusting device, with which the wear readjusting device can be restored to its original outset position for changing the friction brake linings.

BRIEF DESCRIPTION OF THE DRAWINGS

The invention will be better understood and further objects and advantages thereof will become more apparent from the ensuing detailed description of preferred embodiments, taken in conjunction with the drawings, in which.

DESCRIPTION OF THE PREFERRED EMBODIMENTS

Figure 1:
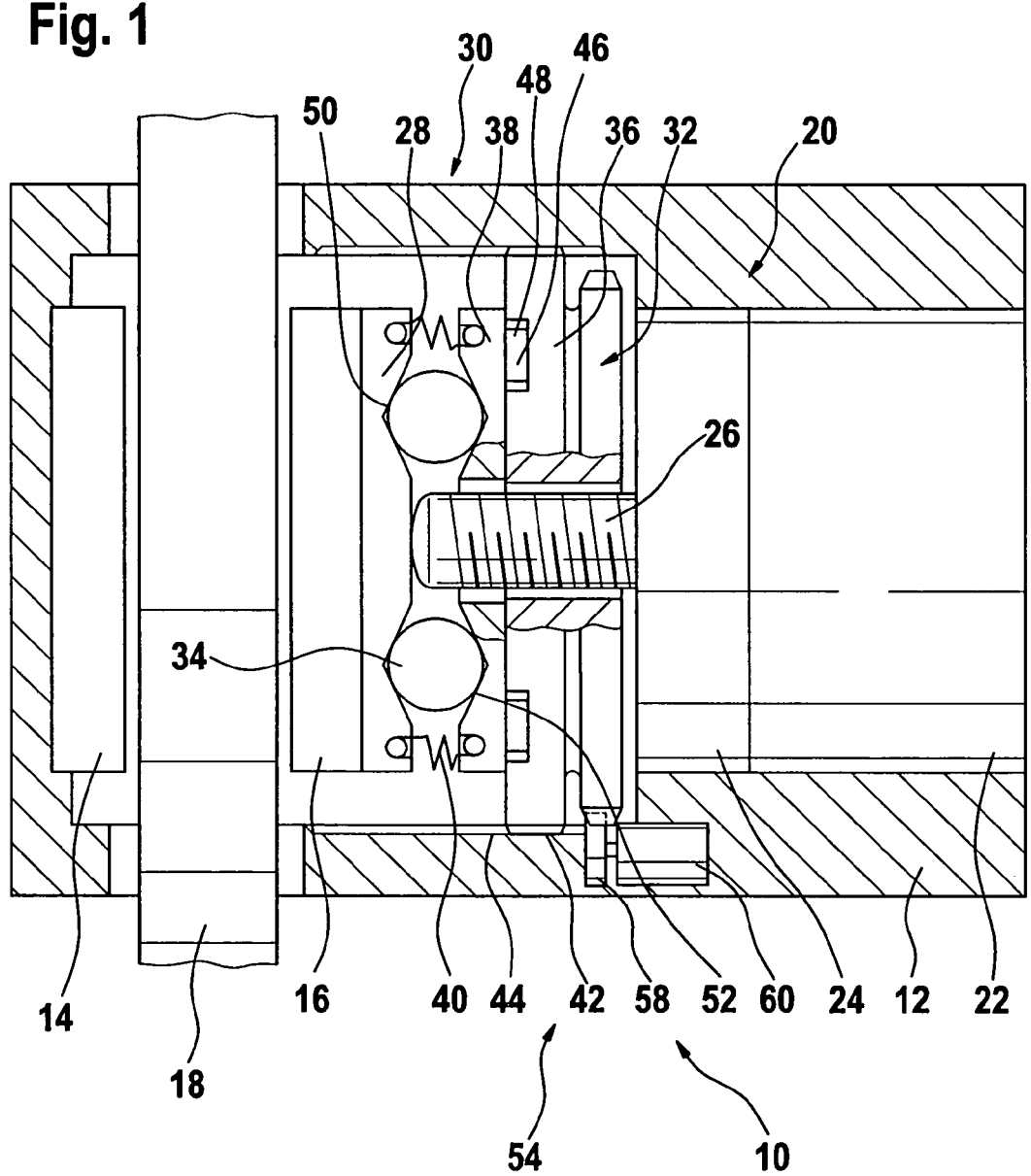
FIG. 1 is a simplified schematic showing of a disk brake of the invention, looking radially inward, that is, from the direction of an imaginary axis of rotation of a brake disk.

The disk brake 10 of the invention shown in FIG. 1 has a brake caliper 12, in which two friction brake linings 14, 16 are located. Between the two friction brake linings 14, 16, there is one brake disk 18. One of the two friction brake linings 14 is disposed fixedly in the caliper 12, and other friction brake lining 16 can be pressed by an actuation unit 20 against the brake disk 18 for braking. The caliper 12 is embodied as a so-called floating caliper; it is displaceable transversely to the brake disk 18, so that contact pressure against the movable friction brake lining 16 displaces the caliper 12 transversely to the brake disk 18, so that it presses the fixed friction brake lining 14 against the other side of the brake disk 18.

An electromechanical actuation unit 20 includes an electric motor 22 with a step-down gear 24 flanged to it and with a spindle drive which forms a rotation/translation conversion gear, for converting the rotary driving motion of the electric motor 22 or of the step-down gear 24 into a translational motion, presses the friction brake lining 16 against the brake disk 18. All that can be seen of the spindle drive in the drawing is a spindle 26. For the rest, the spindle drive is located in a housing of the step-down gear and is therefore not visible in the drawing. Likewise, all that can be seen of the electric motor 22 and the step-down gear 24 is their housings. The spindle 26 presses with its face end against a wedge plate 28, on whose side toward the brake disk 18 the movable friction brake lining 16 is secured.

The disk brake 10 has a mechanical self-boosting device 30. The self-boosting device 30 includes, besides the wedge plate 28, a bracing means 32 and roller bodies 34 that are disposed between the wedge plate 28 and the bracing means 32. The bracing means 32 includes a support plate 36 and a counterpart wedge plate 38, which is disposed opposite the wedge plate 28, on a side of the support plate 36 toward the wedge plate 28 and the brake disk 18. Restoring springs 40 act upon the wedge plate 28 with a spring force oriented away from the brake disk 18. One essential function of the restoring springs 40 is that they keep the self-boosting device 30 together.

The wedge plate 28, and together with it, the movable friction brake lining 16 are displaceable transversely and parallel to the brake disk 18 in the caliper 12. The counterpart wedge plate 38 is guided displaceably in the caliper 12, in a manner fixed against relative rotation and transversely to the brake disk 18. The support plate 36 has a thread 42, with which it meshes with a thread 44 of the caliper 12. The thread 44 of the caliper 12 is embodied as a segmental thread; it does not extend over the entire circumference, but instead there are two opposed thread segments, which extend over portions that are limited in the circumferential direction. Rotating the support plate 36 allows its spacing from the brake disk 18 to be adjusted. The counterpart wedge plate 38 is braced axially on the support plate 36. The support plate 36 is rotatable relative to the counterpart wedge plate 38 that is guided in a manner fixed against relative rotation in the caliper 12; for purposes of rotary bearing, needles 46 are provided, which rest in a circular, flat groove 48 of rectangular cross section in the support plate 36. The needles 46 form an axial needle bearing.

The wedge plate 28, on its side remote from the brake disk 18, has indentations 50 of V-shaped cross section. Cheek faces of the V-shaped indentations 50 form wedge faces; the V-shaped indentations 50 form double wedges and will hereinafter be called that, or simply wedges, and are likewise identified by reference numeral 50. The wedge faces of the double wedges 50 are at an obtuse angle to one another.

The counterpart wedge plate 38 has identical indentations 52 of V-shaped cross section, which are disposed opposite the double wedges 50. These V-shaped indentations 52 form counterpart wedges and will hereinafter be called that. The roller bodies 34, which in the exemplary embodiment of the invention shown and described are embodied as rollers, rest in opposed V-shaped indentations that the double wedges 50 and the counterpart wedges 52 form.

The self-boosting device 30 functions as follows:

If the actuation unit 20, for braking, presses the movable friction brake lining 16 against the rotating brake disk 18, the latter exerts a frictional force on the friction brake lining 16, which displaces the friction brake lining 16 in the caliper 12 both parallel to the brake disk 18 and in the direction of rotation thereof. Along with the friction brake lining 16, the wedge plate 28 is displaced, and consequently the roller bodies 34 roll on the double wedges 50 and the counterpart wedges 52. The roller bodies 34 each roll on one wedge face of the double wedges 50 and one corresponding, diagonally opposed wedge face of the counterpart wedges 52. The respective other wedge face of the double wedges 50 and counterpart wedges 52 is intended for displacement of the friction brake lining 16 in the opposite direction, upon a reversed direction of rotation of the brake disk 18. Via the roller bodies 34, the friction brake lining 16 is braced on the counterpart wedge plate 38 of the bracing means 32. The displacement of the friction brake lining 16 that in braking is pressed against the brake disk 18 causes, because of the bracing via the roller bodies 34 on the wedge faces and counterpart wedge faces, a force component perpendicular to the brake disk 18, or in other words an additional contact-pressure force of the friction brake lining 16 against the brake disk 18. This contact-pressure force is operative in addition to the contact-pressure force exerted by the actuation unit 20. The disk brake 10 thus has self-boosting, which increases the braking force.

The support plate 36 that is rotatable in the thread 44 of the caliper 12 is part of a wear readjusting device 54 of the disk brake 10 for compensating for wear of the friction brake linings 14, 16. In principle, the wear readjusting device 54 may also be disposed on the opposite side of the brake disk 18, that is, on the side of the fixed friction brake lining 14, in the caliper 12. In that case, instead of the counterpart wedge plate 38, the fixed friction brake lining 14 will be adjusted transversely to the brake disk 18 in order to compensate for wear to the friction brake linings 14, 16.

By rotation of the support plate 36 in the thread 44 of the caliper 12, the support plate 36 is moved transversely to the brake disk 18 in the caliper 12. Along with the support plate 36, the counterpart wedge plate 38, which is braced axially on the support plate 36, also moves. In this way, a spacing of the support plate 36 and of the counterpart wedge plate 38 from the brake disk 18 and thus in the final analysis an air clearance between the friction brake lining 16 and the brake disk 18 can be set. The air clearance is the spacing between the friction brake lining 16 and the brake disk 18 when the disk brake 10 is not actuated. By rotation of the support plate 36, wear to the friction brake linings 14, 16 can be compensated for in this way. For the rotation, the support plate 36 has an integral ring gear which meshes with a gear wheel 58 of an electric motor 60. The electric motor 60 forms an actuator of the wear readjusting device 54 that has the support plate 36.

Figure 2:
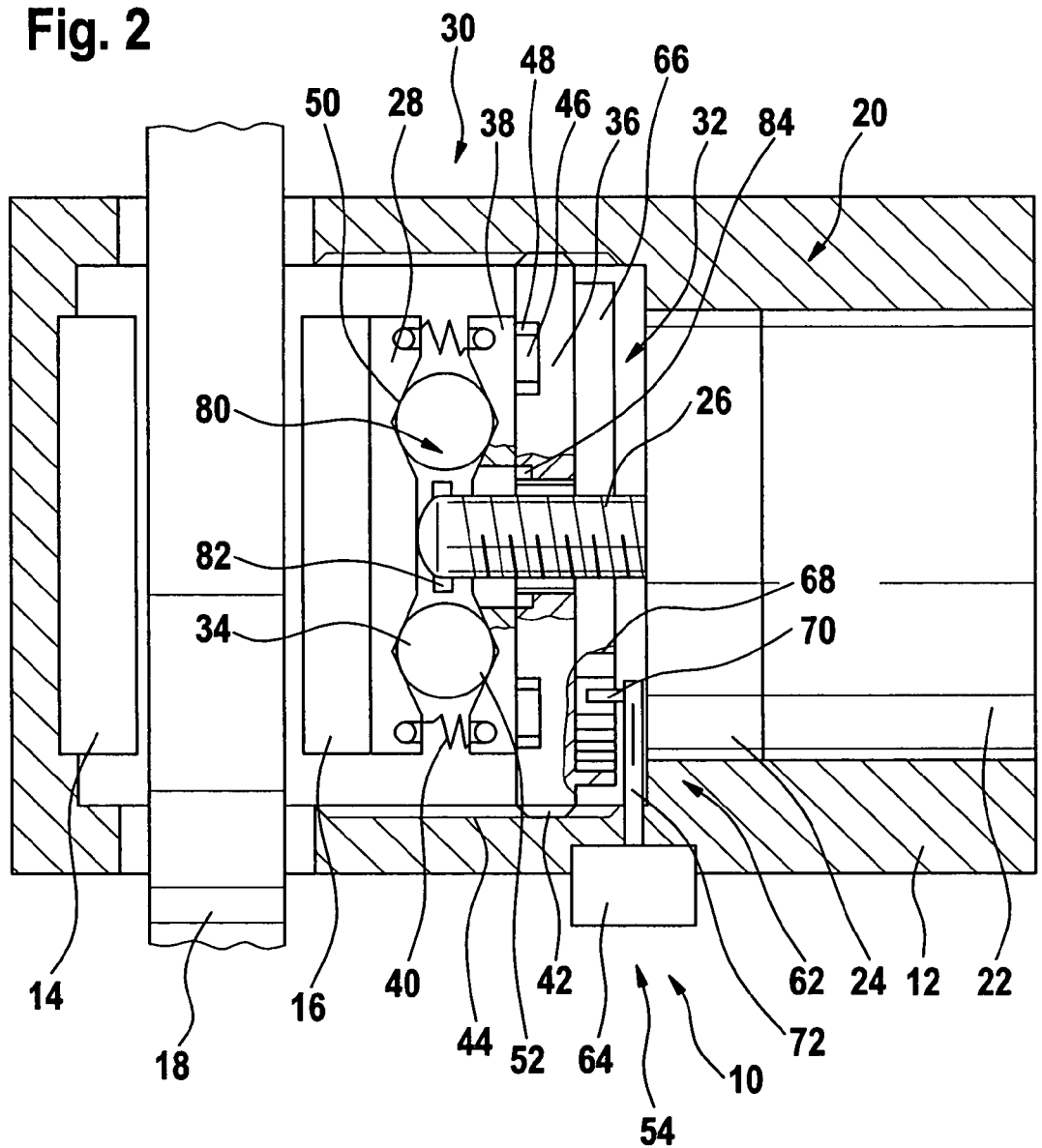
FIG. 2 similarly shows a modified exemplary embodiment of the disk brake of FIG. 1 of the invention.

The disk brake 10 of the invention shown in FIG. 2 has a stepping gear 62 for rotating the support plate 36 of the wear readjusting device 54. The stepping gear 62 is driven by a lifting magnet 64, which forms an actuator of the wear readjusting device 54. The stepping gear 62 is embodied similarly to a ratchet; it has an internal gear wheel 66, which is integral with the support plate 36 and has a sawtoothed set of teeth 68. The set of teeth 68 is visible in FIG. 2 through the broken-open part of the internal gear wheel 66, in the lower part of the drawing. Cooperating with the set of teeth 68 is a pin 70, which is mounted transversely on the end of a tappet 72. The tappet 72 is disposed parallel to one face end of the internal gear wheel 66 and beside the latter gear wheel and is driven to reciprocate by the lifting magnet 64. The pin 70 on the end of the tappet 72 protrudes from the face end into the set of teeth 68 of the internal gear wheel 66. As a result of a reciprocating motion of the tappet 72, its pin 70 moves the internal gear wheel 66 onward by one tooth at a time. Because of the sawtoothed shape of the set of teeth 68, the pin 70, upon a reverse stroke of the tappet 72, comes out of engagement with the set of teeth 68. In a distinction from FIG. 1, in the exemplary embodiment of the invention shown in FIG. 2 the support plate 36 can rotate in only one direction. The direction of rotation is selected such that the support plate 36 moves in the direction of the brake disk 18.

The disk brake 10 of FIG. 2 also has a restoring device 80, with which the wear readjusting device 54 can be restored to its outset position so that the friction brake linings 14, 16 can be changed. The restoring device 80 includes a slaving pin 82, which penetrates the spindle 26, near its end toward the wedge plate 28 and the brake disk 18. The slaving pin 82 protrudes past the spindle 26 on both sides. The slaving pin 82 cooperates with two ramps 84, which are mounted in the form of helical indentations, surrounding the spindle 26, in the support plate 36. The ramps 84 have the shape of half of one thread pitch; they extend around the spindle 26 over approximately one-half a rotation, and on their ends they form stops for the slaving pin 82. With their ends, the ramps 84 transmit a torque in one direction of rotation from the slaving pin 82 to the support plate 36. The ramps 84 have the same pitch direction and approximately the same pitch as the thread 44 of the caliper 12. Rotating the spindle 26 in reverse puts the slaving pin 82 into contact with the ramps 84 and causes it to strike the ends thereof and rotates the support plate 36 along with it. In the process, the support plate 36 is screwed in the thread 44 of the caliper 12 in the direction of the electric motor 22, or in other words away from the brake disk 18, into its outset position. For restoration of the support plate 36, the pin 70 of the tappet 72 of the wear readjusting device is disengaged from the set of teeth 68 of the internal gear wheel 66 by the lifting magnet 64, so that the support plate 36 is rotatable in the restoration direction.

The disk brakes 10 shown in FIG. 1 and in FIG. 3, which is to be described below, require no restoring devices, since in them, the support plate 36 can be not only brought into position but also restored by the wear readjusting device 54.

With the exception of the above-explained drive of the wear readjusting device 54, the disk brakes 10 shown in FIGS. 1 and 2 are embodied identically and function identically. To avoid repetition in describing FIG. 3, reference is made to the description of FIG. 1 in this respect.

Figure 3:
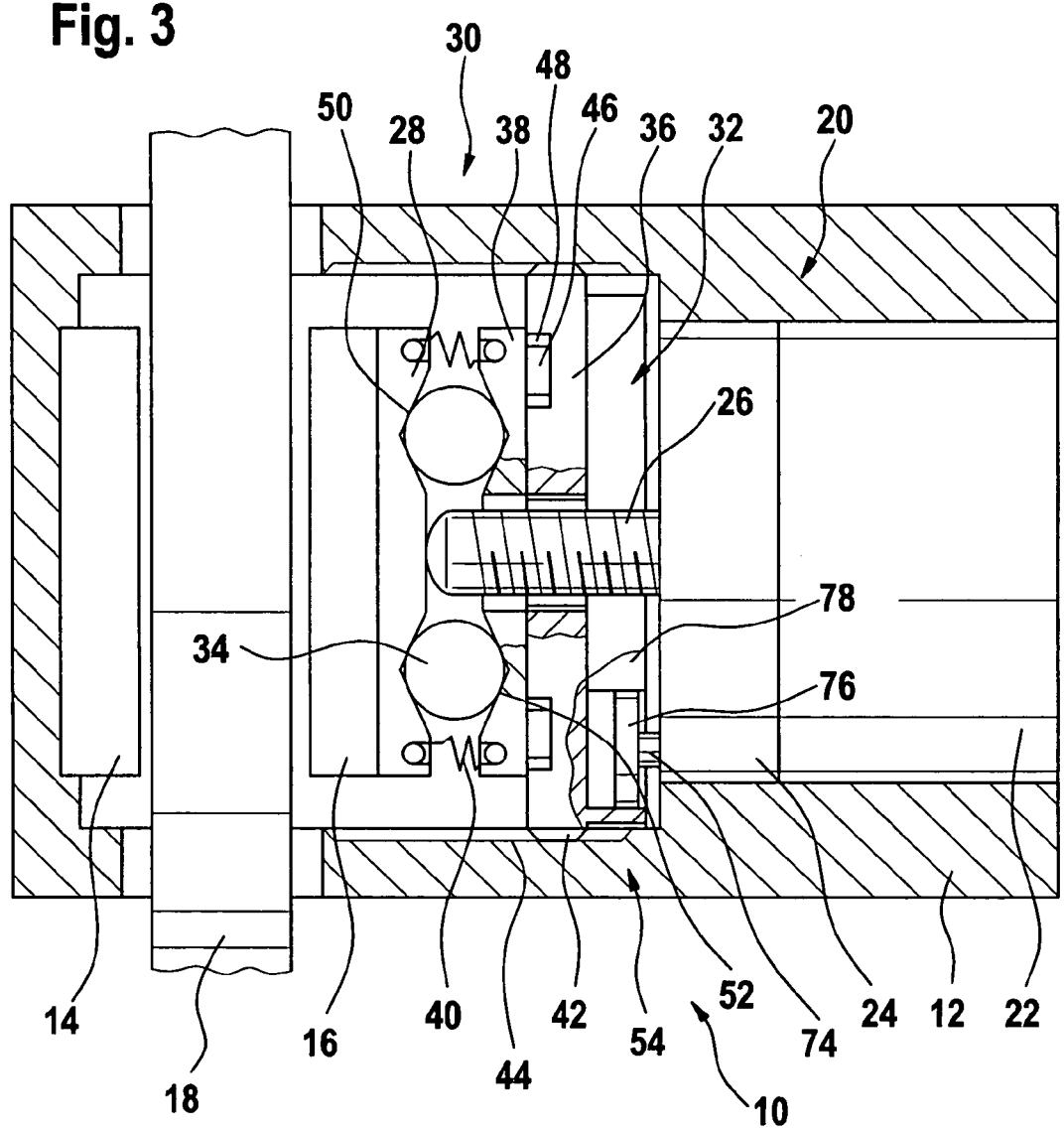
FIG. 3 shows a further exemplary embodiment of a disk brake of the invention.

In the disk brake 10 of the invention shown in FIG. 3, the electric motor 22 of the actuation unit 20 simultaneously forms the actuator of the wear readjusting device 54. The gear 24 is embodied here as a distributor gear; besides the spindle drive, it also has a second power takeoff shaft 74, on which a gear wheel 76 that meshes with an internal gear wheel 78 is mounted in a manner fixed against relative rotation. The internal gear wheel 78 is connected to the support plate 36 in a manner fixed against relative rotation. By switchover of the distributor gear 24 or by activation of the power takeoff shaft 74, the gear wheel 76 can be driven to rotate, in the first instance by itself and in the second instance jointly with the spindle drive, and in this way the wear readjusting device 54 can be set. Such distributor gears 24 are known per se and will therefore not be explained here. Otherwise, the disk brake 10 shown in FIG. 3 is also embodied in the same way as that of FIG. 1 and functions in the same way. In this respect, for FIG. 3, reference is made to the description of FIG. 1.

With the exception of the above-explained embodiment of the gear 24 as a distributor gear for actuating the disk brake 10 and for the wear readjusting device 54, the disk brake 10 shown in FIG. 3 is embodied identically to the disk brake of FIG. 1 and functions in the same way. To avoid repetition, for the description of FIG. 3, the description of FIG. 1 is therefore referred to.

The foregoing relates to preferred exemplary embodiments of the invention, it being understood that other variants and embodiments thereof are possible within the spirit and scope of the invention, the latter being defined by the appended claims.

We claim:

1. A disk brake with self-boosting comprising: a friction brake lining, an actuation unit with which the friction brake lining can be pressed against a brake disk, and a self-boosting device which, when the disk brake is actuated, converts a frictional force, exerted by the rotating brake disk against the friction brake lining pressed against it, into a contact-pressure force which, in addition to the actuation unit, presses the friction brake lining against the brake disk, and the self-boosting device having a wedge plate on a back side of the friction brake lining, remote from the brake disk, that is braced on a counterpart wedge plate braced axially on a support plate, said counterpart wedge plate being movable with respect to said support plate, wherein the disk brake (10) comprises a wear readjusting means (54) to compensate for wear of the friction brake lining (14, 16); the wear readjusting means (54) having an actuator (22; 60; 64); the wear readjusting means (54) being operable to adjust a spacing between the support plate and the brake disk (18), wherein the friction brake lining (14, 16) is located in a caliper and wherein the wear readjusting means (54) comprises a thread (42) positioned on a peripheral portion of the support plate which meshes with a thread (44) located on the caliper.

2. The disk brake in accordance with claim 1, wherein the actuator of the wear readjusting means (54) comprises an electric motor (60) for rotating the thread (42) of the support plate.

3. The disk brake in accordance with claim 1, wherein the wear readjusting means (54) comprises a stepping drive mechanism (62), with which the thread (42) of the support plate is rotatable in stepped fashion.

* * * * *